(12) United States Patent
Takasu et al.

(10) Patent No.: US 12,517,038 B2
(45) Date of Patent: Jan. 6, 2026

(54) CONTROL CUVETTE

(71) Applicant: ARKRAY, Inc., Kyoto (JP)

(72) Inventors: Tsuyoshi Takasu, Kyoto (JP); Shinya Nakajima, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 269 days.

(21) Appl. No.: 18/128,373

(22) Filed: Mar. 30, 2023

(65) Prior Publication Data

US 2023/0314306 A1    Oct. 5, 2023

(30) Foreign Application Priority Data

Apr. 4, 2022    (JP) .................................. 2022-062652

(51) Int. Cl.
*G01N 21/03*    (2006.01)

(52) U.S. Cl.
CPC ..................... *G01N 21/03* (2013.01)

(58) Field of Classification Search
CPC ...... G01N 21/03; G01N 33/493; G01N 21/07; G01N 21/278; G01N 33/48778; G01N 21/84; G16H 30/20; G16H 30/40
USPC ........................................................ 356/246
See application file for complete search history.

(56) References Cited

U.S. PATENT DOCUMENTS

| | | | | | |
|---|---|---|---|---|---|
| 4,178,345 | A | * | 12/1979 | Terk ...................... | E21F 17/185 422/430 |
| 4,197,088 | A | * | 4/1980 | Meserol ........... | G01N 33/54366 436/805 |
| 4,373,931 | A | * | 2/1983 | Takekawa .......... | G01N 33/5304 422/918 |
| 4,666,850 | A | * | 5/1987 | Mehl ...................... | A61B 5/153 435/308.1 |
| 5,962,422 | A | * | 10/1999 | Nagy .................... | A61K 9/1273 435/7.1 |
| 6,265,229 | B1 | * | 7/2001 | Fodstad ........... | G01N 33/56966 435/395 |
| 2010/0143964 | A1 | * | 6/2010 | Mor ...................... | G01N 33/569 435/308.1 |
| 2018/0195938 | A1 | * | 7/2018 | Lee ...................... | G01N 33/491 |
| 2020/0371086 | A1 | * | 11/2020 | Das ...................... | G01N 33/493 |

FOREIGN PATENT DOCUMENTS

| | | |
|---|---|---|
| DE | 102008007739 A1 | 8/2009 |
| JP | 2020-531852 A | 11/2020 |
| WO | 2019/165119 A1 | 8/2019 |

OTHER PUBLICATIONS

Extended European Search report dated Jul. 20, 2023, issued in corresponding European Patent Application No. 23165983.0.
Office Action issued in corresponding European Patent Application No. 23165983.0, dated Mar. 11, 2025.

* cited by examiner

*Primary Examiner* — Michelle M Iacoletti
(74) *Attorney, Agent, or Firm* — Morgan, Lewis & Bockius LLP

(57) ABSTRACT

A control cuvette used for measurement accuracy control in a measuring apparatus for observing a formed element contained in a liquid sample after precipitating the formed element to a bottom surface of a cuvette, wherein an observation pattern representing a shape of the formed element contained in the liquid sample is provided at an observation surface of the control cuvette corresponding to the bottom surface of the cuvette.

19 Claims, 7 Drawing Sheets

CONTROL CUVETTE

CROSS-REFERENCE TO RELATED APPLICATION

This application claims priority under 35 USC 119 from Japanese Patent Application No. 2022-062652, filed on Apr. 4, 2022, the disclosure of which is incorporated by reference herein.

BACKGROUND

Technical Field

The present invention relates to a control cuvette used for measurement accuracy control in a measuring apparatus for observing a formed element contained in a liquid sample after precipitating the formed element to a bottom surface of a cuvette.

Related Art

Conventionally, in cases in which the amount and the type of a formed element contained in a liquid sample derived from a living body are examined by microscopy in which an examiner uses a microscope for visual examination, a commercially available liquid sample in which a formed element is dispersed at a known content (hereinafter referred to as "control substance") is used. Then, images of the control substance and the liquid sample to be examined are captured, and the captured images are compared to carry out the examination.

Further, in measuring apparatuses that automatically perform the examination of a formed element in a liquid sample, the control substance is used for controlling measurement accuracy of the measuring apparatus based on a comparison of the known content with the amount of the formed element detected based on image data obtained by capturing an image of the control substance.

For example, Japanese National-Phase Publication (JP-A) No. 2020-531852 describes that accuracy control is required for urinary sediment analyzers to correctly detect samples, and that some specimens of sediments (erythrocytes, leukocytes, crystals, and the like) found in urine are commercially available as accuracy control substances.

However, in cases in which a control substance is used for accuracy control of a measuring apparatus for observing a formed element contained in a liquid sample after precipitating the formed element to a bottom surface of a cuvette, the formed element of the control substance in a container needs to be thoroughly dispersed in the liquid sample before the collection of the control substance from the container, and, when the dispersion of the formed element in the liquid sample is insufficient, the amount of the formed element detected based on image data obtained by capturing an image may show variation.

Further, in cases in which the liquid sample contains a large number of types of formed elements, control substances used for accuracy control of the measuring apparatus need to be provided in a number in accordance with the number of types of formed elements.

Further, in cases in which a formed element contained in the liquid sample is a rare element, it is inevitably difficult to obtain the control substance used for the accuracy control of the measuring apparatus.

Further, in cases in which the control substance is a liquid derived from a living body, long-term storage of the control substance may be difficult.

An aspect of the present disclosure provides a control cuvette that can be used for measurement accuracy control in a measuring apparatus for observing a formed element contained in a liquid sample after precipitating the formed element to a bottom surface of a cuvette.

SUMMARY

A control cuvette in an aspect of the disclosure is a control cuvette used for measurement accuracy control in a measuring apparatus for observing a formed element contained in a liquid sample after precipitating the formed element to a bottom surface of a cuvette, the control cuvette having an observation pattern representing a shape of the formed element contained in the liquid sample, the observation pattern being applied to an observation surface of the control cuvette corresponding to the bottom surface of the cuvette.

The invention provides a control cuvette used for measurement accuracy control in a measuring apparatus for observing a formed element contained in a liquid sample after precipitating the formed element to a bottom surface of a cuvette.

BRIEF DESCRIPTION OF THE DRAWINGS

Exemplary embodiments will be described in detail based on the following figures, wherein.

DETAILED DESCRIPTION

Figure 1:
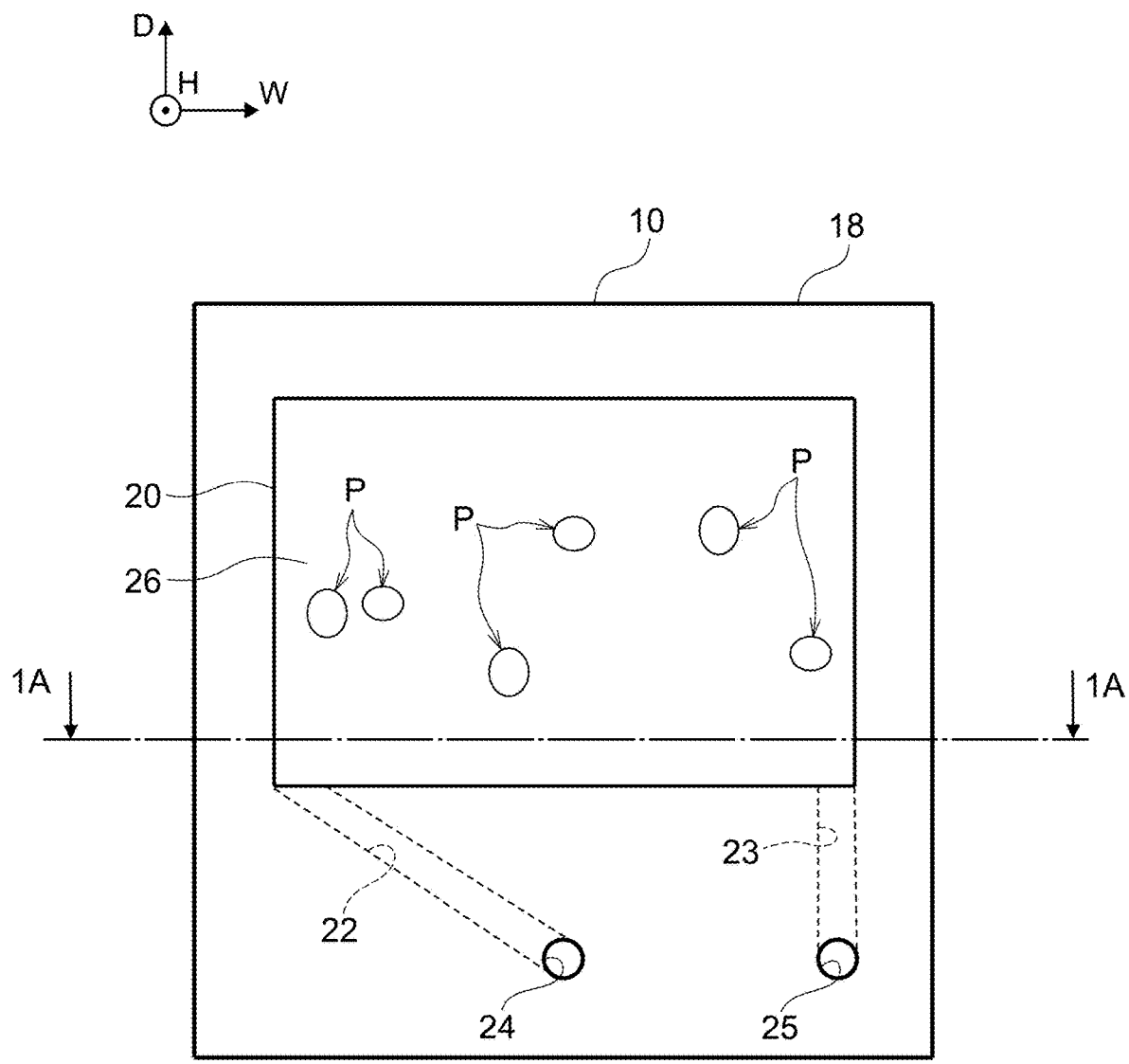
FIG. 1 is a plan view illustrating a control cuvette of an embodiment.

An example of embodiments of the disclosure is described below with reference to the drawings. In the drawings, the same reference symbols are given to identical or equivalent components and parts. Since the drawings are schematic, they may show sizes different from the actual sizes.

An arrow H shown in each diagram indicates a vertical upward direction of a control cuvette 10 during imaging; an arrow W indicates a horizontal width direction of the control cuvette 10 during imaging; and an arrow D indicates a horizontal depth direction of the control cuvette 10 during imaging.

(Control Cuvette 10)

Figure 2:
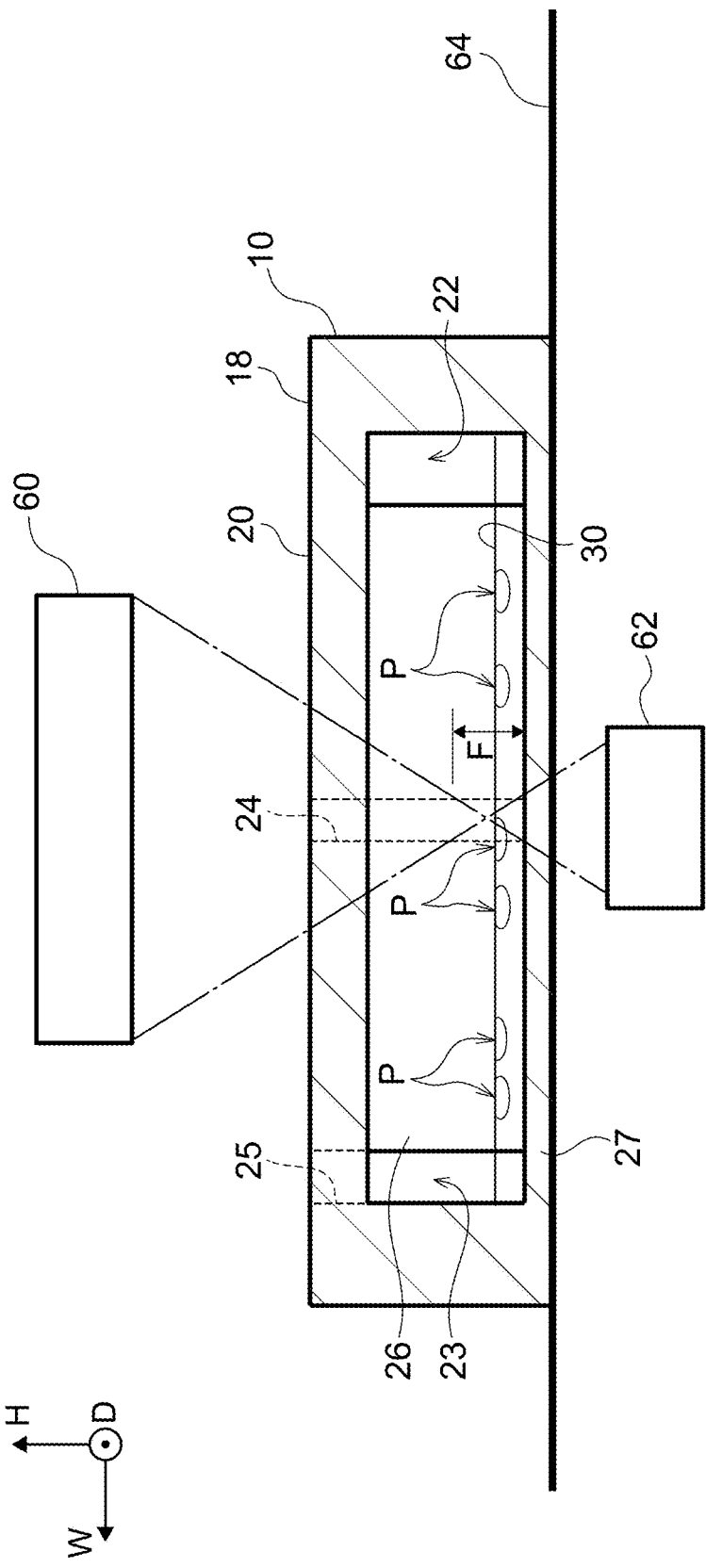
FIG. 2 is a cross-sectional view illustrating the control cuvette of the embodiment.

FIG. 1 is a plan view illustrating a control cuvette 10 according to the disclosure, and FIG. 2 is a cross-sectional view as seen from the direction of the 1A-1A line in FIG. 1. As illustrated in FIG. 1 and FIG. 2, the control cuvette 10 according to the disclosure is, for example, a hollow container formed with a light-transmitting material (resin, glass, or the like) including: a case 18 having an substantially rectangular shape in a planar view, and having a light entrance section 27 and an observation window 20 formed on a face in a lower side and a face in a upper side, respectively, along a vertical direction during imaging; an observation section 26 formed inside the case 18 during imaging; a first channel 22; and a second channel 23.

As shown in FIG. 2, the observation section 26 is a part having a height and a width inside the case 18, and is a part (or space) surrounded by the case 18 in the horizontal direction, by the observation window 20 in the vertical upward direction, and by the light entrance section 27 in the vertical downward direction.

Further, the light entrance section 27, the observation section 26, and the observation window 20 are sections through which light radiated from a light source 62 transmits during the imaging described later. More specifically, as illustrated in FIG. 2, during the imaging using the measuring apparatus, light radiated from a light source 62 placed below a mounting table 64 of the measuring apparatus transmits through the light entrance section 27, the observation section 26, and the observation window 20 in this order, followed by being observed by an imaging device 60 placed above the control cuvette 10. The bottom portion of the observation section 26 is used as an observation surface 30. Details of the observation surface 30 are described later.

Note that the case 18 has a shape having dimensions of, for example, 22 mm in the width direction, 20 mm in the depth direction, and 3 mm in the vertical direction. Further, the observation section 26 has a shape having dimensions of, for example, 15 mm in the width direction, 10 mm in the depth direction, and 1 mm in the vertical direction.

The first channel 22 is a part through which an inlet 24, formed in the upward direction during imaging in the control cuvette 10, communicates with the observation section 26.

The second channel 23 is connected to the observation section 26 similarly to the first channel 22, and is, for example, a part through which an air vent port 25, formed in the upward direction during imaging in the control cuvette 10, communicates with the observation section 26.

Note that the inlet 24 is, for example, a hole having a diameter of 0.7 mm, and the air vent port 25 is, for example, a hole having a diameter of 0.5 mm.

Here, as shown in FIG. 2, in the control cuvette 10 according to the disclosure, an observation surface 30 is placed in a bottom portion of the observation section 26, wherein an observation pattern P representing a shape of the formed element 52 is applied to the observation surface 30.

The width direction and the depth direction of the observation surface 30 are, for example, the same as those of the observation section 26, and, in the vertical direction, the observation surface 30 has irregularities formed with a photosetting resin within the range of the depth of focus F in the imaging device 60 during the later-described imaging.

Thus, in a control cuvette 10 according to one embodiment, light radiated from the light source 62 transmits through the observation surface 30 of the observation section 26 to reach the imaging device 60, to allow the imaging device 60 to capture an image of the observation pattern P representing the shape of the formed element 52 applied to the observation surface 30. The procedure for forming the observation surface 30, and the specific shape of the observation surface 30 are described later.

Further, the shape of the control cuvette 10 is preferably the same as the shape of a cuvette 15 for liquid sample measurement used for the imaging device 60 as described later. In a case in which the shape of the control cuvette 10 is the same as the shape of the cuvette 15, the imaging device 60 can be simply configured since members of the measuring apparatus such as the mounting table 64 can be shared between imaging of the cuvette 15 and imaging of the control cuvette 10. It is not necessary for the shape of the control cuvette 10 to be completely the same as that of the cuvette 15. For example, it is not necessary for the control cuvette 10 to be provided with the first channel 22, the second channel 23, the inlet 24, the air vent port 25, or the like.

A procedure for preparing the control cuvette 10 according to the disclosure is described as follows. The procedure for preparing the control cuvette 10 includes: a procedure for capturing an image of the formed element 52 in the liquid sample 50 using the cuvette 15; and a procedure for transferring an observation pattern P representing the shape of the formed element 52 whose image has been captured using the cuvette 15, to the observation surface 30.

(Procedure for Capturing Image of Formed Element 52 in Liquid Sample 50 Using Cuvette 15)

Figure 3:
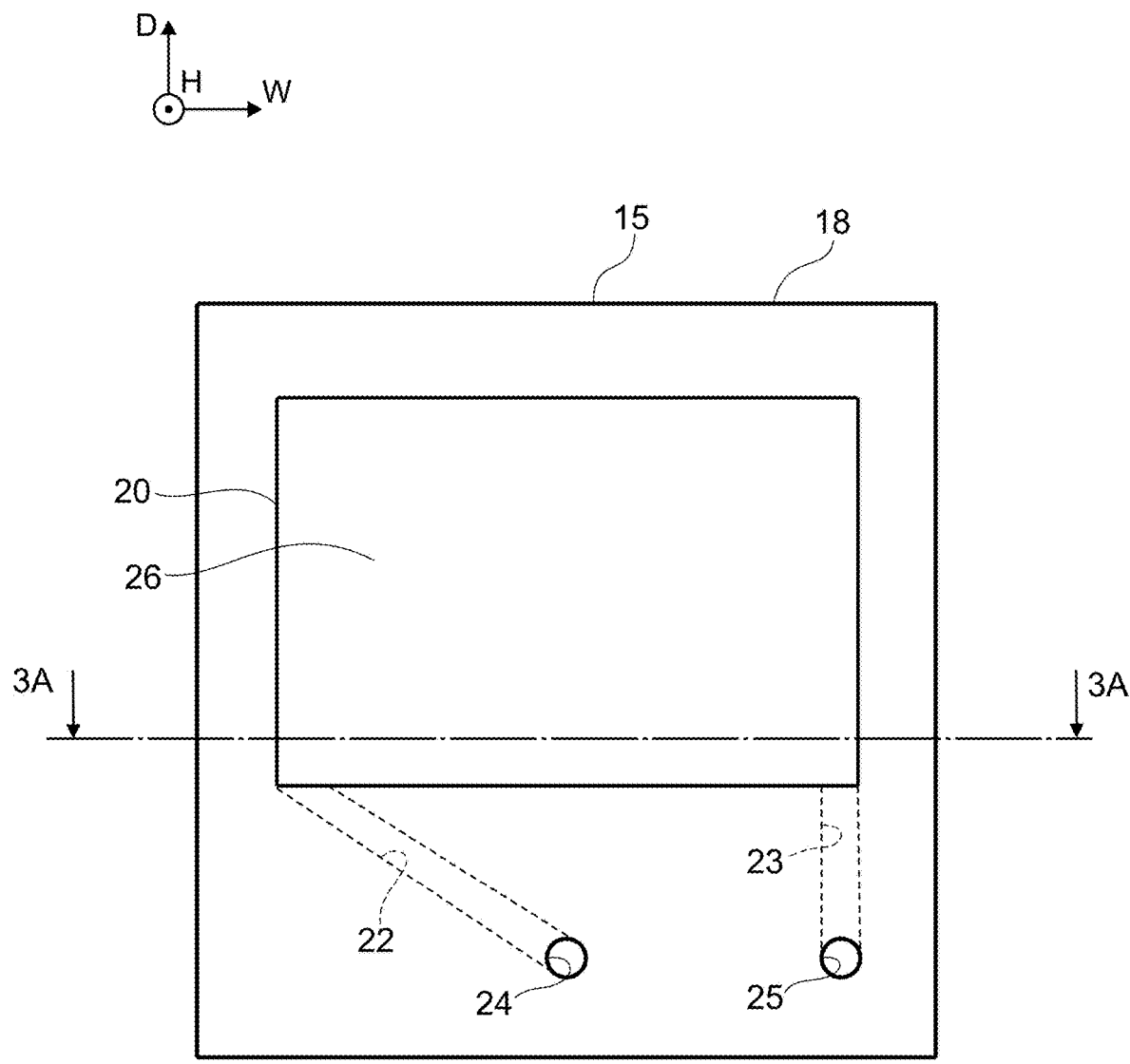
FIG. 3 is a plan view illustrating a cuvette used for obtaining an observation pattern of a formed element, which observation pattern is to be applied to the control cuvette of the embodiment.
Figure 4:
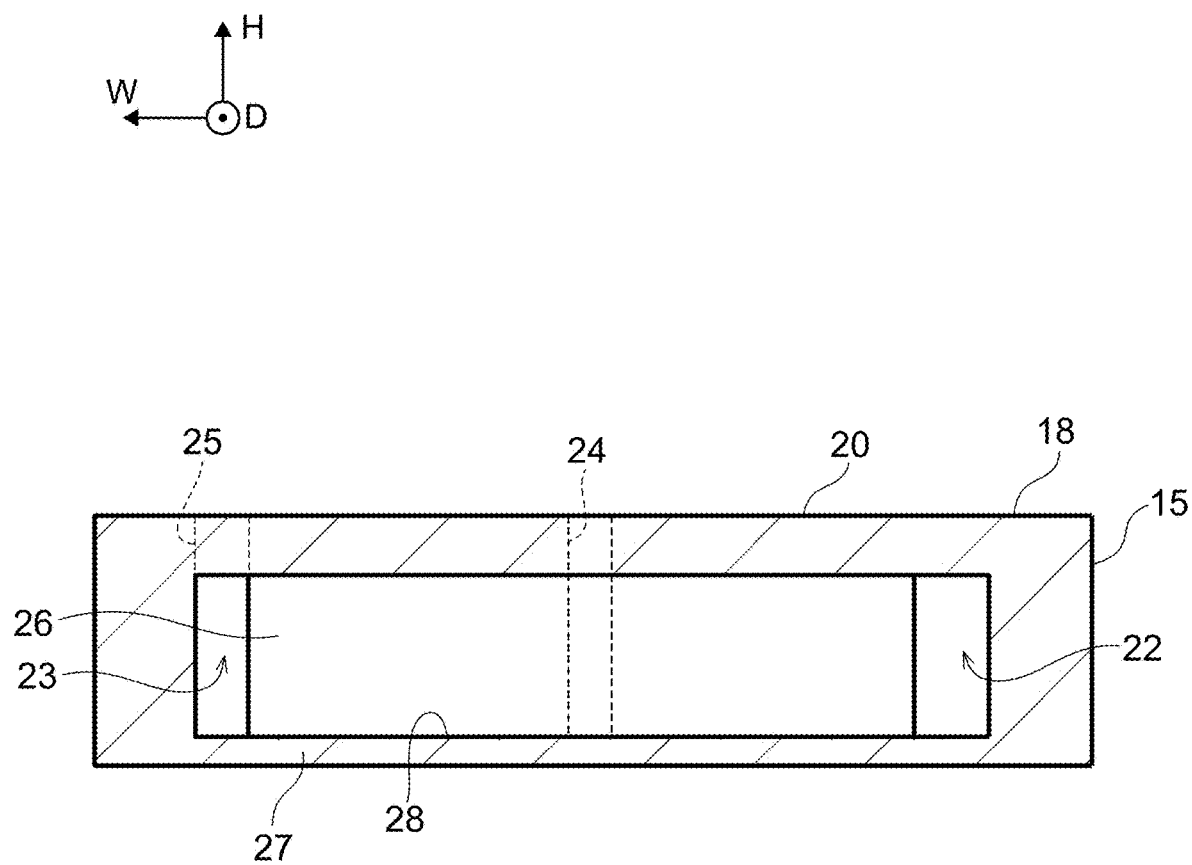
FIG. 4 is a cross-sectional view illustrating the cuvette used for obtaining the observation pattern of the formed element, which observation pattern is to be applied to the control cuvette of the embodiment.

FIG. 3 is a plan view of the cuvette 15, and FIG. 4 is a cross-sectional view as seen from the direction of the 3A-3A line in FIG. 3. In this description, a detailed description of the same components as those in the control cuvette 10 in the cuvette 15 is omitted by giving the same symbols.

As illustrated in FIG. 3 and FIG. 4, the cuvette 15 has the same configuration as the control cuvette 10 according to the disclosure except that the observation pattern P is not applied to the bottom surface 28 of the observation section 26. In other words, the control cuvette 10 according to the disclosure can be said to be a cuvette in which the part corresponding to the bottom surface 28 of the cuvette 15 is the observation surface 30, or a cuvette prepared by applying the observation pattern P to the bottom surface 28 of the cuvette 15.

The liquid sample 50 containing the formed element 52 is supplied into the observation section 26 of the cuvette 15, and an image of the formed element 52 contained in the liquid sample 50 in the observation section 26 is captured by the imaging device 60.

Figure 5A:
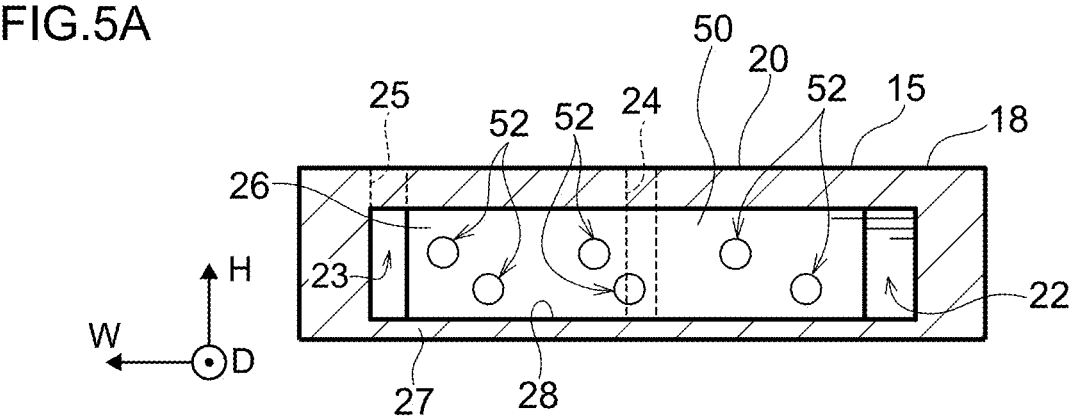
FIG. 5A is a diagram illustrating the cuvette used for obtaining the observation pattern of the formed element, which observation pattern is to be applied to the control cuvette of the embodiment, wherein the diagram illustrates a state in which a liquid sample containing the formed element has been supplied to the cuvette.
Figure 5B:
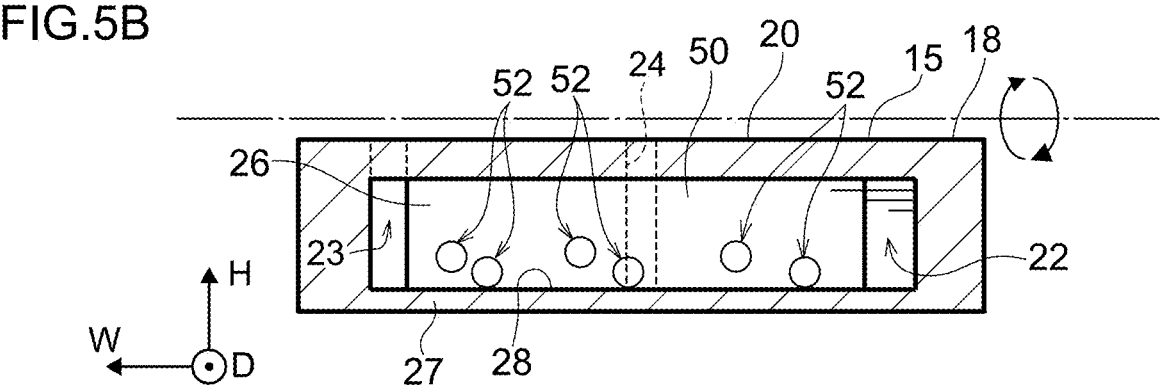
FIG. 5B is a diagram illustrating the cuvette used for obtaining the observation pattern of the formed element, which observation pattern is to be applied to the control cuvette of the embodiment, wherein the diagram illustrates a state in which the formed element is precipitating during centrifugation treatment of the cuvette.
Figure 5C:
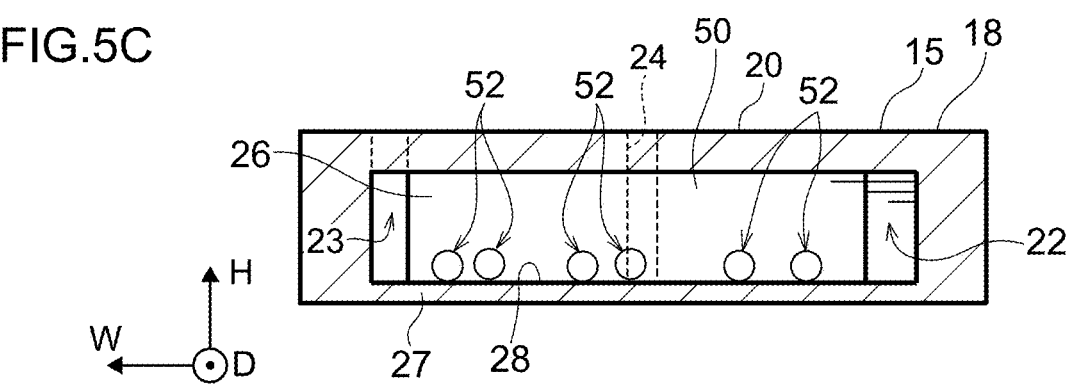
FIG. 5C is a diagram illustrating the cuvette used for obtaining the observation pattern of the formed element, which observation pattern is to be applied to the control cuvette of the embodiment, which diagram illustrates a state in which the formed element has been precipitated on the bottom surface by centrifugation treatment of the cuvette.

FIG. 5A to FIG. 5C are diagrams illustrating a process in which the liquid sample 50 is supplied to the observation section 26 of the cuvette 15 to prepare for the observation.

First, as illustrated in FIG. 5A, the liquid sample 50, containing the formed element 52, is supplied from the inlet 24 to the cuvette 15, to fill the observation section 26 with the liquid sample 50. Note that, by supplying the liquid sample 50 from the inlet 24, the air filling the observation section 26 is discharged from the air vent port 25. Note that the liquid sample 50 may be any type of liquid, and examples of the liquid sample 50 include liquids derived from a living body, such as urine or blood of a human.

Subsequently, as illustrated in FIG. 5B, the cuvette 15 is subjected to centrifugation treatment using a rotation axis positioned above the cuvette 15. In this centrifugation treatment, the centrifugal force in the observation section 26 causes the formed element 52 contained in the liquid sample 50 to precipitate to the bottom surface 28 of the observation section 26 as illustrated in FIG. 5C.

The time and the rotation speed of the centrifugation of the cuvette 15 are appropriately determined in accordance with the amount and/or the type of the liquid sample 50 to be observed, the type of the formed element 52, and the like.

Figure 6:
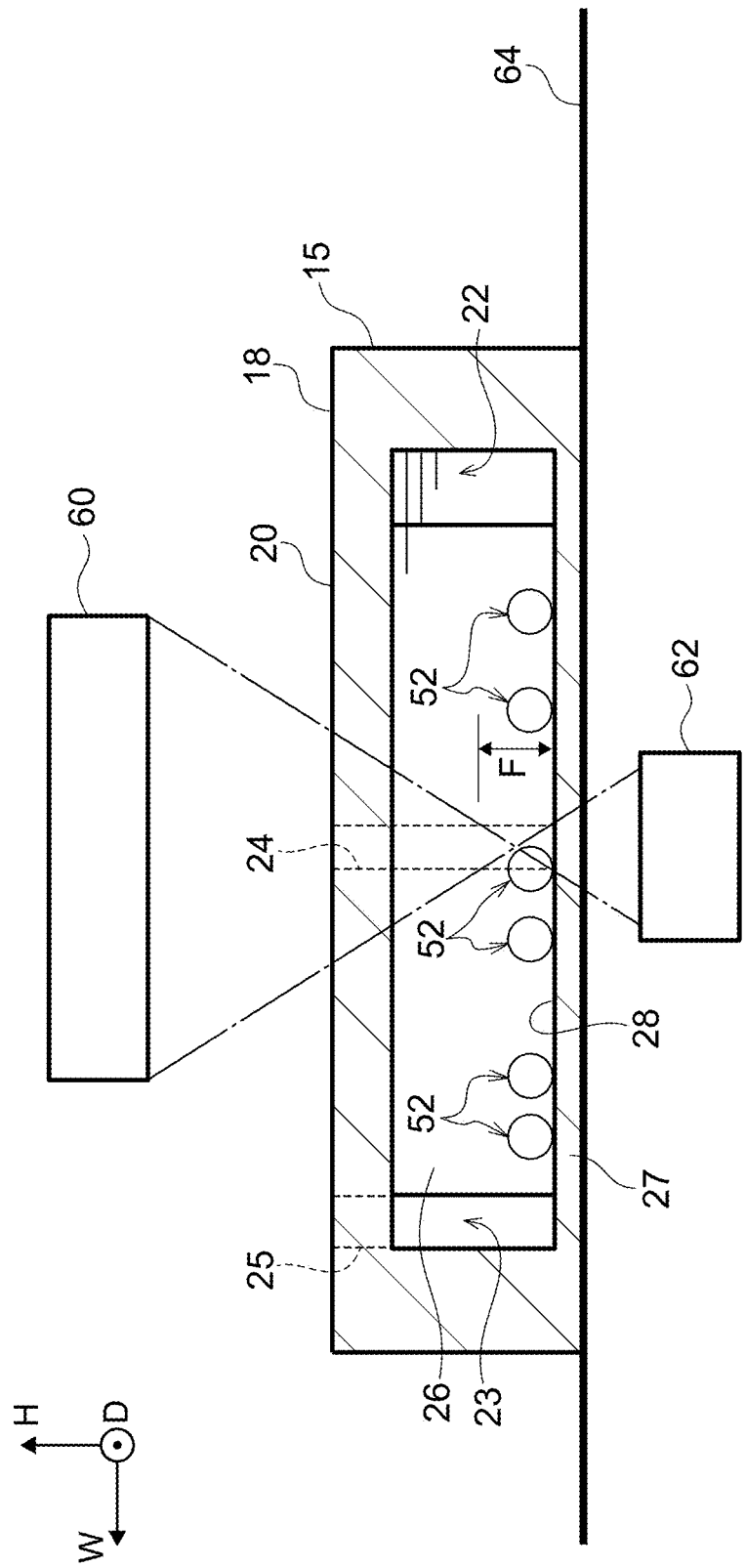
FIG. 6 is a diagram illustrating the cuvette used for obtaining the observation pattern of the formed element, which observation pattern is to be applied to the control cuvette of the embodiment, wherein the diagram illustrates a state in which the formed element is measured using an apparatus.

FIG. 6 is a diagram illustrating a process in which the cuvette 15 is mounted on the mounting table 64, and in which the formed element 52 is observed by the imaging device 60 while light is radiated from the light source 62.

As illustrated in FIG. 6, the formed element 52 is positioned within the depth of focus F of the imaging device 60 in a state in which the formed element 52 is precipitated in the bottom portion of the observation section 26. Thus, the imaging device 60 is capable of capturing an image of the shape of the formed element 52 positioned in the bottom portion of the observation section 26. The shape of the formed element 52 whose image has been captured by the imaging device 60 is, for example, converted into electronic data.

(Procedure for Transferring Observation Pattern P Representing Shape of Formed Element 52 Whose Image has been Captured Using Cuvette 15, to Observation Surface 30)

The procedure for transferring the observation pattern P representing the shape of the formed element 52 whose image has been captured using the cuvette 15, to the observation surface 30 is described as follows with reference to FIG. 7 as appropriate.

Figure 7:
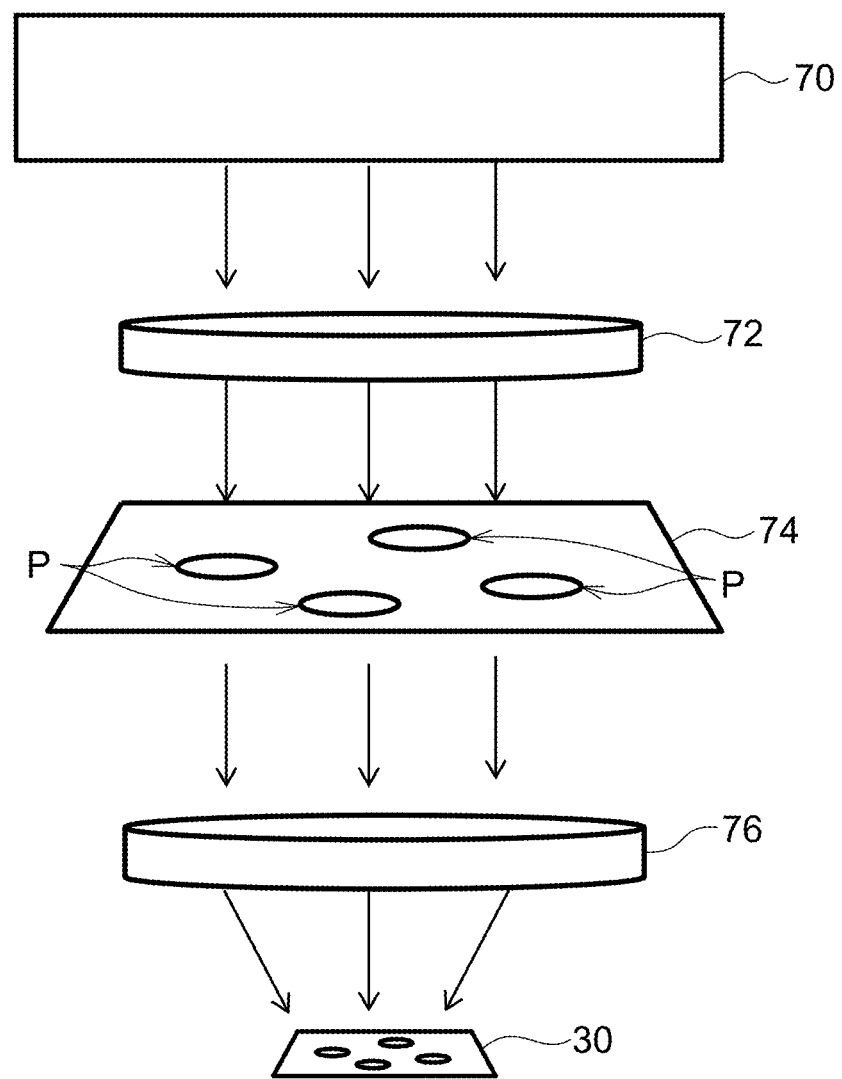
FIG. 7 is a diagram illustrating a procedure for preparing the control cuvette of the embodiment, wherein the diagram illustrates a state in which the observation pattern of the formed element is transferred to an observation surface by a photolithography process.

FIG. 7 is a diagram illustrating a procedure for forming the observation pattern P representing the shape of the formed element 52, on the observation surface 30 using a photolithography apparatus.

First, as illustrated in FIG. 7, the photolithography apparatus includes an irradiation device 70 for generating light; a condenser lens 72 for condensing the light emitted from the irradiation device 70, a photomask 74 for blocking part of the light that has transmitted through the condenser lens 72, and a projector lens 76 for projecting the light that has transmitted through the photomask 74, to the observation surface 30.

On the photomask 74 shown in FIG. 7, the observation pattern P representing the shape of the formed element 52 in the liquid sample 50, whose image has been captured in FIG. 6, is printed using a light-blocking ink based, on the electronic data mentioned above. In other words, on the photomask 74, a light-blocking ink is applied to the part excluding the part corresponding to the observation pattern P. The type of the light-blocking ink is not limited as long as the ink blocks light emitted from the irradiation device 70.

Further, in FIG. 7, the observation surface 30 has a photosetting resin applied thereto which cures in reaction to light emitted from the irradiation device 70. The curing of the photosetting resin occurs only in the part irradiated with the light emitted from the irradiation device 70.

Then, after the photosetting resin applied to the observation surface 30 has been cured by the exposure to the light through the photomask 74 as illustrated in FIG. 7, the observation surface 30 is washed. As a result, the photosetting resin remains only on the part corresponding to the observation pattern P while the resin on the other part is removed. This results in transfer of the observation pattern P representing the shape of the formed element 52 to the observation surface 30. Since the part on which the photosetting resin remains has a thicker layer of the photosetting resin than the part from which the resin has been removed, the amount of light that passes from the back side to the front side of the observation surface 30 through the part on which the photosetting resin remains is smaller than the amount of light that passes from the back side to the front side of the observation surface 30 through the part from which the photosetting resin has been removed.

Note that, in the observation pattern P formed on the photomask 74, the amount of the light-blocking ink applied may be set in accordance with the tone of the shape obtained by the imaging of the formed element 52, if appropriate.

Further, in the above description, the control cuvette 10 has the pattern representing the shape of the formed element 52, formed on the observation surface 30. However, this need not be the case as long as the pattern of the observation pattern P representing the shape of the formed element 52 can be observed with the light that has transmitted through the observation surface 30.

For example, instead of the photosetting resin applied to the observation surface 30 in the above description, a photodegradable resin may be provided. In this case, the photodegradable resin is degraded, and hence removed, only in the part exposed to the light through the photomask 74.

Further, a film on which a pattern representing the shape of the formed element 52 is formed may be attached to the observation surface 30 such that the observation pattern P representing the shape of the formed element 52 can be observed when the control cuvette 10 is examined by microscopy.

In such a manner, an arbitrary number of the observation pattern P representing the shape of an arbitrary formed element 52 can be transferred onto the observation surface 30 of the control cuvette 10. By capturing an image of the observation pattern P applied to the observation surface 30 of the control cuvette 10 using a measuring apparatus, the shape of the formed element 52 whose image is captured using the cuvette 15 shown in FIG. 6 is captured as the observation pattern P.

Examples of Use of Control Cuvette 10

As an example of the use of the control cuvette 10 according to the disclosure, a procedure for a case in which the control cuvette 10 according to the disclosure is used for accuracy control of a measuring apparatus for examining a formed element 52 in a liquid sample 50 is described below.

First, an examiner selects a control cuvette 10 to which an observation pattern P of the formed element 52 assumed to be contained in the liquid sample 50 is applied.

Subsequently, as illustrated in FIG. 2, the examiner captures an image of the observation pattern P of the formed element 52 provided in the control cuvette 10, using a measuring apparatus. Thereafter, the examiner confirms whether the observation pattern P included in the captured image data of the control cuvette 10 is recognized by the measuring apparatus as the formed element 52 in the liquid sample 50.

At this time, in a case in which the measuring apparatus does not recognize the shape of the observation pattern P included in the captured image data of the control cuvette 10 as the shape of the formed element 52 in the liquid sample 50, or where the measuring apparatus recognizes the shape of the observation pattern P as the shape of a formed element 52 of a type different from the formed element 52 in the liquid sample 50 whose pattern has been applied to the control cuvette 10, or where a measured value of the density of the formed element 52 output by the measuring apparatus based on the measurement of the control cuvette 10 does not correspond to the density of the formed element 52 in the liquid sample 50 (that is, the density of the observation pattern P applied to the control cuvette 10), the examiner can judge that the sensitivity of the measuring apparatus for measuring the formed element 52 in the liquid sample 50 supplied to the cuvette 15 has changed.

Further, when the examiner has judged that the sensitivity of the measuring apparatus for examining the formed element 52 in the liquid sample 50 by microscopy has changed, the examiner can carry out a process such as adjustment of the measurement sensitivity of the measuring apparatus. On the other hand, when the sensitivity has been judged not to have changed, the examiner can judge that the adjustment of the measuring apparatus has been completed.

Subsequently, the examiner captures again an image of the observation pattern P of the formed element 52 applied to the control cuvette 10, and repeats the adjustment of the measuring apparatus such that the measuring apparatus recognizes the observation pattern P included in the captured image data of the control cuvette 10 as the pattern of the formed element 52 in the liquid sample 50.

Then, after the completion of the adjustment of the measuring apparatus, the examiner supplies the liquid sample 50 into the cuvette 15, and carries out measurement of the formed element 52 contained in the liquid sample 50 in the cuvette 15, using the measuring apparatus whose adjustment has been completed.

In such a manner, the examiner uses the control cuvette 10 according to the disclosure for the purposes of confirmation of the sensitivity and adjustment of the sensitivity for the measurement of the formed element 52 in the liquid sample 50 by the measuring apparatus. It is not necessary for the control cuvette 10 in the above description to be a single cuvette. Depending on the type and the concentration of the formed element 52 contained in the liquid sample 50 to be examined, a plurality of control cuvettes 10 may be provided and selected, if appropriate.

Effects

According to the control cuvette 10 according to the aspect described above, the following effects can be obtained.

The control cuvette 10 according to the aspect of the disclosure is a control cuvette 10 used for measurement accuracy control in a measuring apparatus for observing a formed element 52 contained in a liquid sample 50 after precipitating the formed element 52 to a bottom surface 28 of a cuvette 15, the control cuvette 10 having the same shape as the cuvette 15, and having an observation pattern P representing the shape of the formed element 52 contained in the liquid sample 50, the observation pattern P being applied to an observation surface 30 corresponding to the bottom surface 28 of the cuvette 15.

According to this control cuvette 10, since the observation pattern P representing the shape of the formed element 52 contained in the liquid sample 50 is applied to the observation surface 30 observed by the measuring apparatus, capturing an image of the observation pattern P of the control cuvette 10 enables acquisition of image data that are similar to those in a case in which an image of the formed element 52 is captured using the cuvette 15. Thus, the control cuvette 10 can be used for the control of the measurement accuracy of the measuring apparatus for capturing an image of the formed element 52 after precipitating the formed element 52 to the bottom surface of the cuvette 15.

Further, according to the control cuvette 10 according to the aspect of the disclosure, by providing a plurality of control cuvettes 10 to which the pattern of the formed element 52 contained in the liquid sample 50 is applied, a control cuvette 10 to which the pattern of a desired type of formed element 52 is applied in a desired number can be arbitrarily selected and used for the accuracy control. In other words, in cases in which a liquid sample 50 containing a plurality of formed elements 52 to be observed is measured, the examiner may provide control cuvettes 10 to which an observation pattern P representing the shape of each formed element 52 to be observed is applied. Thereby, the cost required for the examination can be reduced.

Further, according to the control cuvette 10 according to the aspect of the disclosure, the cuvette can be repeatedly used for the control of the measurement accuracy even when a rare formed element 52 is to be measured. In other words, even in cases of measurement of a rare formed element 52 for which a control substance cannot be easily obtained, the control of the measurement accuracy in the measurement of the rare formed element 52 is possible by providing a control cuvette 10 to which an observation pattern P representing the shape of the formed element 52 to be measured is applied.

Further, the control cuvette 10 according to the aspect of the disclosure can be easily stored since the control cuvette 10 itself hardly shows deterioration. In other words, the cost required for the examination can be reduced relative to cases in which the cuvette 15 and the control substance are used in the control of the measurement accuracy for the formed element 52.

To the observation surface 30 of the control cuvette 10 according to the aspect of the disclosure, an observation pattern P representing the shape of the formed element 52, formed based on image data obtained by capturing an image of the liquid sample 50 containing the formed element 52 using the cuvette 15, is applied, and the observation surface 30 of the control cuvette 10 corresponds to the bottom surface 28 of the cuvette 15. Thus, the density of the observation pattern P applied to the observation surface 30 of the control cuvette 10 corresponds to the density of the formed element whose image is captured from the liquid sample 50. Therefore, by using the control cuvette 10, the measurement accuracy of the measuring apparatus can be judged in terms of the shape and the density.

Further, according to the control cuvette 10 according to the aspect of the disclosure, similar observation results can be obtained even when different examiners carry out the examination by microscopy.

Thereby, according to the control cuvette 10 according to the aspect of the disclosure, an examiner who is less experienced in the identification of the type and the number of a formed element based on the observation of the size and the shape of the formed element can use the control cuvette 10 as a specimen showing the shape of the formed element 52 observed using the cuvette 15, or as a training sample for the examination of the formed element.

Further, according to the control cuvette 10 according to the aspect of the disclosure, the observation pattern P representing the shape of a formed element 52 contained in urine or blood as the liquid sample 50 is applied to the observation surface 30.

According to this control cuvette 10, since the observation pattern P of the formed element 52 contained in urine or blood is applied thereto, the cuvette can also be used for accuracy control of the liquid sample 50 derived from a living body.

Modification Examples

The above description is given for cases in which a formed element 52 contained in a liquid sample 50 is examined by microscopy using a cuvette 15. However, the technique according to the disclosure is not limited thereto.

For example, an effect similar to that of the control cuvette 10 according to the disclosure can be obtained also in a case in which the examination by microscopy is carried out using, as the device for the examination by microscopy, a slide glass rather than the cuvette 15, by forming the observation pattern P representing the shape of the formed element 52 on an observation section of the slide glass similarly to the case of the control cuvette 10 described above.

Although the embodiments of the disclosure have been described above with reference to the accompanying drawings, it is obvious that those of ordinary skill in the art to which the disclosure belongs can infer various modification examples or application examples within the scope of the technical ideas described in the claims. It should be understood that such modification examples and application examples, of course, belong to the technical scope of the disclosure.

INDUSTRIAL APPLICABILITY

The invention is applicable to measurement accuracy control in a measuring apparatus for observing a formed element contained in a liquid sample after precipitating the formed element to a bottom surface of a cuvette.

What is claimed is:

1. A control cuvette used for measurement accuracy control in a measuring apparatus configured for observing a formed element contained in a liquid sample in a cuvette after precipitating the formed element to a bottom surface of the cuvette, the control cuvette comprising:
an observation surface, wherein a predetermined observation pattern including a shape of a formed element contained in a liquid sample in a predetermined cuvette is formed on the observation surface, and wherein the observation surface of the control cuvette corresponds to the bottom surface of the cuvette, and
wherein the predetermined observation pattern is formed to the observation surface of the control cuvette by capturing an image of the shape of the formed element contained in the liquid sample in the predetermined cuvette and forming the observation pattern including the shape of the formed element whose image has been captured using the predetermined cuvette, to the observation surface of the control cuvette.

2. The control cuvette according to claim 1, wherein the observation pattern is formed by irradiating light to a photosetting resin or a photodegradable resin applied to the observation surface.

3. The control cuvette according to claim 1, wherein the observation pattern includes a shape of a formed element contained in urine or blood.

4. The control cuvette according to claim 3, wherein the control cuvette and the cuvette have a same shape.

5. The control cuvette according to claim 4,
wherein the observation pattern is applied to the observation surface at a density corresponding to an observed density of the formed element contained in the liquid sample in the predetermined cuvette.

6. The control cuvette according to claim 3,
wherein the observation pattern is applied to the observation surface at a density corresponding to an observed density of the formed element contained in the liquid sample in the predetermined cuvette.

7. The control cuvette according to claim 1, wherein the control cuvette and the cuvette have a same shape.

8. The control cuvette according to claim 7,
wherein the observation pattern is applied to the observation surface at a density corresponding to an observed density of the formed element contained in the liquid sample in the predetermined cuvette.

9. The control cuvette according to claim 1,
wherein the observation pattern is applied to the observation surface at a density corresponding to an observed density of the formed element contained in the liquid sample in the predetermined cuvette.

10. The control cuvette according to claim 1, further including a film attached to the control cuvette,
wherein the observation pattern is applied to the observation surface of the control cuvette by forming the captured image of the formed element to the film and attaching the film on the observation surface of the control cuvette.

11. The control cuvette according to claim 1, further comprising a film including the observation pattern and attached to the observation surface of the control cuvette.

12. The control cuvette according to claim 11, wherein the observation pattern is applied to the observation surface of the control cuvette by forming the captured image of the formed element to the film and attaching the film on the observation surface of the control cuvette.

13. A control cuvette used for measurement accuracy control in a measuring apparatus configured for observing a formed element contained in a liquid sample in a cuvette after precipitating the formed element to a bottom surface of the cuvette, the control cuvette comprising:
an observation window;
a light entrance section spaced from the observation window; and
an observation surface formed on the light entrance section,
wherein a predetermined observation pattern including a shape of a formed element contained in a liquid sample in a predetermined cuvette is formed on the observation surface of the control cuvette.

14. The control cuvette according to claim 13, wherein the predetermined observation pattern is formed to the observation surface of the control cuvette by capturing an image of the shape of the formed element in the liquid sample in the predetermined cuvette, and forming the observation pattern including the shape of the formed element whose image has been captured using the predetermined cuvette, to the observation surface of the control cuvette.

15. The control cuvette according to claim 14, wherein the observation surface of the control cuvette includes a photosetting resin or a photodegradable resin.

16. The control cuvette according to claim 15, wherein the observation pattern is formed by irradiating light to the photosetting resin or the photodegradable resin applied to the observation surface.

17. The control cuvette according to claim 13, wherein the observation pattern includes a shape of a formed element contained in urine or blood.

18. The control cuvette according to claim 13, wherein the control cuvette and the cuvette have a same shape.

19. The control cuvette according to claim 13, wherein the observation pattern is applied to the observation surface at a density corresponding to an observed density of the formed element contained in the liquid sample in the predetermined cuvette.

\* \* \* \* \*